Aug. 26, 1969    TATSUO KOBAYASHI    3,463,065
LIGHT RECEIVING APPARATUS FOR AN EXPOSURE METER FOR A CAMERA
Filed Aug. 19, 1965
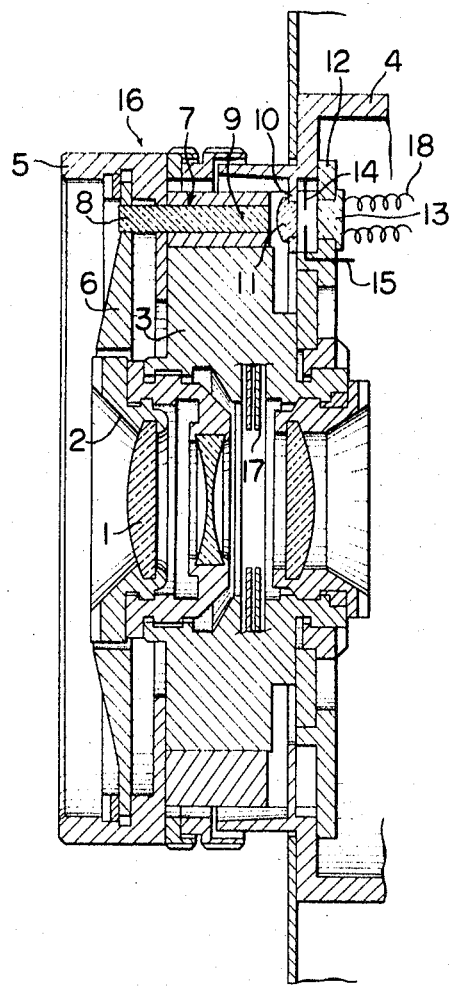

3,463,065
LIGHT RECEIVING APPARATUS FOR AN
EXPOSURE METER FOR A CAMERA
Tatsuo Kobayashi, Osaka, Japan, assignor to Minolta
Camera Kabushiki Kaisha, Osaka, Japan
Filed Aug. 19, 1965, Ser. No. 480,849
Claims priority, application Japan, Aug. 27, 1964,
39/48,863
Int. Cl. G01j 1/02; G03b 7/00
U.S. Cl. 95—10                                3 Claims

ABSTRACT OF THE DISCLOSURE

A camera having a built in exposure meter wherein a light sensitive element is disposed in the camera body. A cylinder assembly is secured to the camera body and a light conductor is mounted in the cylinder to provide a light path for the light sensitive element. A light restricting member is mounted in front of the light sensitive element and is adapted to be adjusted by a film magazine or other adjusting device so that the light received by the light sensitive element is adjusted to compensate for the particular sensitivity of the film contained in the camera. This adjustment is made by an actuating rod which extends into the camera body and is attached to the light restricting member.

---

The present invention relates to a novel light receiving apparatus for use with a camera exposure meter mounted in the camera body and more particularly, to a lens cylinder secured to a camera body and having a light conducting optical member mounted therein for conducting light rays from the object to be photographed to the exposure meter.

Heretofore, it has been proposed to mount a camera exposure meter, having a photocell of the CdS type, on the front portion of the camera lens cylinder. This arrangement has not been entirely satisfactory in that the exposure meter assembly interferes with the camera shutter mechanism. Thus, it was necessary to redesign the lens cylinder to accommodate both the exposure meter and the shutter mechanism resulting in a larger, bulky structure having a less desirable appearance.

To overcome the above-noted disadvantages, the apparatus of the present invention has been devised wherein the exposure meter and the lens cylinder are mounted on the camera body, the lens cylinder including the conventional filter mounting ring and main shutter body including the main photographing lens. The lens cylinder in the apparatus of the present invention is also provided with a light conducting optical member for conducting light rays from the object to be photographed to the exposure meter, the optical member being disposed within the lens cylinder such that its head portion is positioned in proximity to the front face of the lens cylinder and its tail portion is positioned adjacent the exposure meter on the camera body. The filter mounting ring is carried on the front face of the lens cylinder so that when a filter is secured to the mounting ring, the filtered light rays not only appear on the main photographing lens but are also conducted to the exposure meter through the light conducting optical member.

An object of the invention is to provide an improved light receiving apparatus for use with an exposure meter mounted on a camera body.

Another object of the invention is to provide an improved light receiving apparatus for use with an exposure meter mounted on a camera body wherein the camera lens cylinder is provided with a light conducting light optical member for conducting light rays from the object to be photographed to the exposure meter.

Still another object of the invention is to provide a camera lens cylinder with a light conducting optical member disposed therein such that the head portion of the optical member is positioned in proximity to the front face of the lens cylinder and its tail portion is positioned adjacent an exposure meter mounted on the camera body.

Yet still another object of the invention is to provide a camera lens cylinder having a filter mounting ring carried on the front face thereof and a light conducting optical member extending from the front face of the lens cylinder to an exposure meter carried by the camera body, whereby when a filter is secured to the mounting ring, the filtered light rays not only appear on the main photographing lens but are also conducted to the exposure meter through the light conducting optical member.

Another object of the invention is to adjust an iris which controls the light impinging on a built-in light meter in conjunction with the sensitivity of the film. Yet another object of the invention is to enable the adjustment of the iris to be effected automatically by a feeling mechanism which operates independently of the shutter mechanism. In accordance with the invention, this is achieved by positioning an iris in the camera body between the light sensitive member of the light meter and a light conductor which is supported in the lens cylinder, the iris having an actuating rod which extends into the interior of the camera body for being automatically actuated independently of the shutter means to preset the iris to the sensitivity of the film. A notable advantage of this arrangement is the avoidance of modification of the size of the lens cylinder with the attendant difficulties associated therewith.

Other objects and advantages of the present invention will become apparent from the following description of a preferred embodiment taken in connection with the accompanying drawing wherein:

The single figure is a fragmentary, side elevational view in section of the lens cylinder and associated light conducting optical member according to the present invention.

Referring to the drawing, the lens cylinder 16 includes a main photographing lens 1 carried by a holder 2 operatively connected to a main shutter body portion 3 carrying shutter blades 17. The lens cylinder having a filter mounting ring 5 and surface plate 6 positioned on the front face thereof is connected to the camera body 4, said cylinder being provided with a bar-like light conducting optical member 7. The optical member is disposed within the lens cylinder in such a manner that its head portion 8 is positioned adjacent the front face of the lens cylinder in proximity to the filter mounting ring 5 and its tail portion 9 is positioned in proximity to an exposure meter carried on the camera body.

The exposure meter comprises a ring 10 mounted on the camera body and carrying a lens 11 positioned in front of an iris 14 having an actuating rod 15, the iris controlling the amount of light falling upon a photocell 13 having leads 18 and secured to the camera body by means of member 12.

The iris 14 and its actuating rod 15 are mounted on the body 4 and the rod 15 extends into the body to be actuated by a suitable feeling mechanism (not shown) associated with the film inserted into body 4 so that the diameter of the iris aperture is regulated by rod 15 so as to be proportional to the sensitivity of the type of film being used.

The optical member 7 may be a transparent cylinder, tube or any other desired shape, and by its construction and arrangement within the lens cylinder, upon directing the camera to an object to be photographed, the light rays incident therefrom pass through the optical member to the exposure meter mounted on the camera body. When a filter is mounted in the filter mounting ring 5, the filtered light rays not only appear on the main photographing lens 1 of the camera but are also conducted to the exposure meter through the light conducting optical member.

Inasmuch as the preferred embodiment of the present invention is subject to many variations, modifications and changes in detail, it is intended that all matter contained in the foregoing description or shown on the accompanying drawing shall be interpreted as illustrative and not in a limiting sense.

What is claimed is:

1. A camera comprising a camera body adapted for receiving film, and a cylinder assembly secured to said body, said cylinder assembly including lens means and shutter means, a light conductor mounted in said cylinder assembly, light sensitive means mounted in said body and positioned in alignment with said light conductor for receiving light transmitted thereby for controlling the shutter means, iris means mounted in said body and disposed between said light conductor and said light sensitive means for adjustably regulating the amount of light passing to said light sensitive means from the light conductor and means extending from the iris means into the camera body for being operated therein to pre-set the iris means in relation to the sensitivity of the film.

2. A camera as claimed in claim 1 wherein said means which extends from the iris means is an actuating rod.

3. A camera as claimed in claim 2 wherein said cylinder assembly comprises a filter ring adapted for supporting a filter in front of said lens means and said light conductor.

References Cited

UNITED STATES PATENTS 3,212,419  10/1965  Fischer _____ 95—10
3,286,609  11/1966  Kobayashi et al. ____ 95—64 XR NORTON ANSHER, Primary Examiner J. F. PETER, Jr., Assistant Examiner U.S. Cl. X.R.
95—64; 352—141